UNITED STATES PATENT OFFICE.

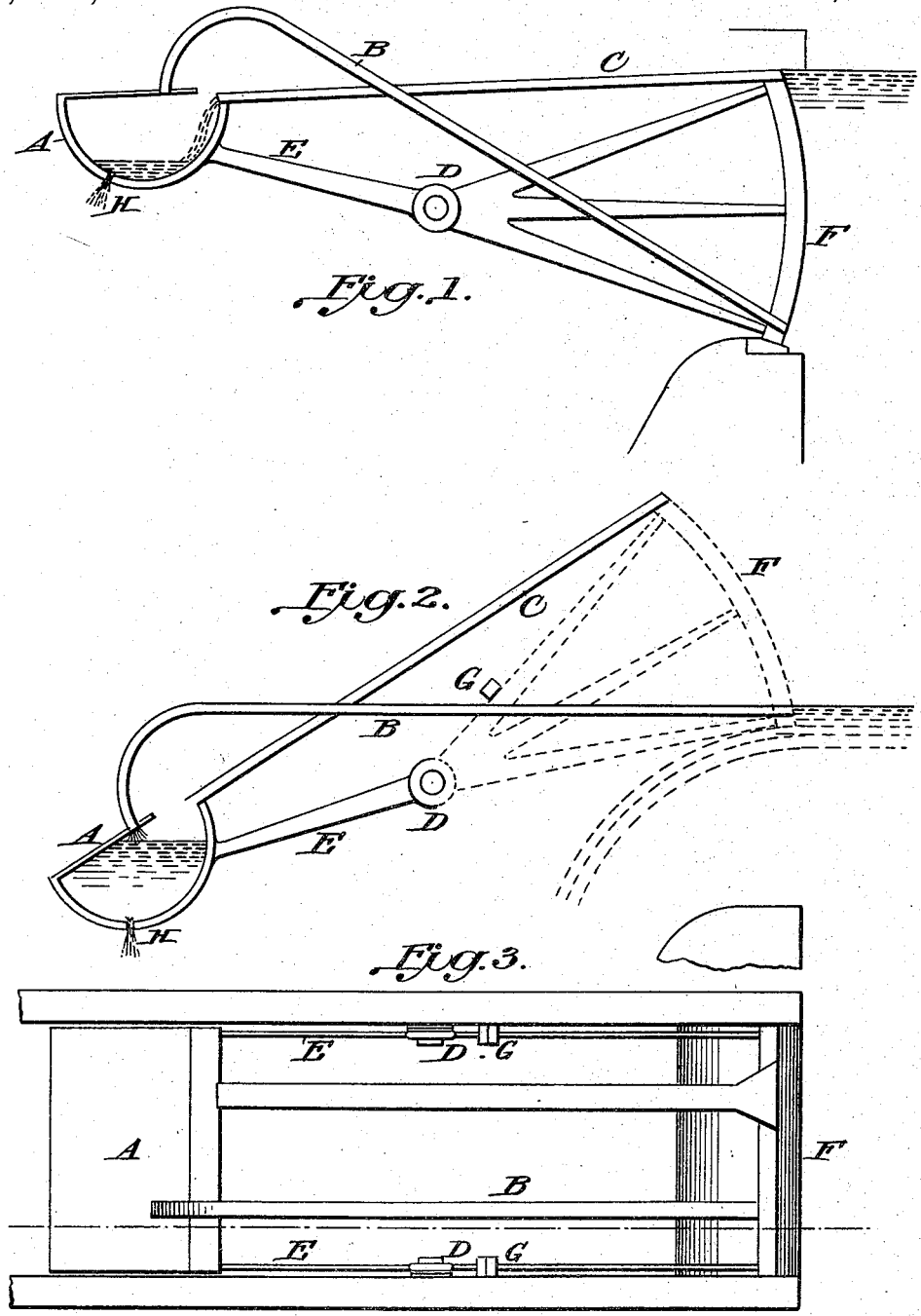

VINCENT K. JONES, OF EAST LAS VEGAS, NEW MEXICO.

WATER-CONTROLLING DEVICE.

1,166,991.   Specification of Letters Patent.   Patented Jan. 4, 1916.

Application filed March 12, 1915. Serial No. 14,042.

*To all whom it may concern:*

Be it known that I, VINCENT K. JONES, a citizen of the United States, residing at East Las Vegas, in the county of San Miguel and State of New Mexico, have invented a new and useful Water-Controlling Device, of which the following is a specification.

My invention relates to the operating mechanism for gates of ordinary types used to control water for irrigation and other purposes, and the improvement thereof; and the objects of my improvement are, first, to enable the gate to be automatically opened at any determined point of level in the body of water to be controlled and, second, to enable the gate to be automatically closed at a determined point of level in the body of water to be controlled, using as the sole means of power the weight of water in a holding device which is connected mechanically with the gate and hydraulically with the body of water to be controlled, this holding device being so arranged that the weight of water contained therein may be varied as required. I attain these objects by the mechanism illustrated in the accompanying drawing, in which—

Figure 1 is a vertical section of the operating mechanism shown in connection with a radial sluice-gate for purposes of illustration, the gate being shown in its position at the moment before opening; Fig. 2, a vertical section as in Fig. 1 but with the gate in its position at the moment before closing; Fig. 3, a plan view of the mechanism in closed position.

Similar letters refer to similar parts throughout the several views.

The part, A, is the holding device which is connected mechanically, either rigidly as shown when attached to a radial type of gate or through a system of levers when used in connection with gates of the sliding types, with the gate or water-controlling device to be operated and hydraulically through means of conduits with the body of water to be controlled. Parts B and C show one arrangement of these conduits. The hole H represents one or more outlets which are adjusted so as to allow the water in the holding device A to be discharged at a determined rate but in any event at a lesser rate than the capacity of the conduits leading from the body of water to be controlled. The parts are to be so arranged that when the level of water in the body of water to be controlled reaches a determined level some water will flow through conduit "C" and fill the holding device "A" whereupon the weight of water in the holding device will cause the gate to which it is mechanically connected to open as far as the point where further opening is limited by the stop or stops "G." When in this position the gate is held in the opened position by the weight of water which is kept sufficient by the water entering the holding device "A" through conduit "B." When the water level in the body of water to be controlled is lowered to such an extent that the capacity of conduit "B" becomes less than the capacity of the outlet or outlets "H" the supply of water in holding device "A" will become depleted and allow the gate to close under its own weight.

The parts "E," "D" and "F" are incidental and are shown only for the purpose of illustrating one means of connecting the operating mechanism to one of the water-controlling devices which are now in common use.

I am aware that prior to my invention water-controlling gates of the radial type as illustrated and other types have been made and that in one instance a tank has been arranged to operate a separate tripping device operated in connection with a hinged gate whereby the water in the body controlled was allowed to be discharged when the water in said body of water reached a certain level. I therefore do not claim such a combination broadly; but,

I claim:

1. A radial gate structure comprising a lever system journaled between the ends and having a gate at one end and an apertured counterbalance tank at the other, a conduit connecting the body of water to be controlled with the tank, the entrance to said conduit being in the upper portion of the gate and arranged to deliver water at a given level in the body of water to be controlled when the gate is closed, and a conduit similarly arranged in the lower portion of the gate to deliver water to the tank from a lower level when the gate is open.

2. A radial gate structure comprising a lever system journaled between the ends and having a gate at one end and an apertured counterbalance tank at the other, a conduit connecting the body of water to be controlled with the tank, the entrance to said conduit being in the upper portion of the gate and arranged to deliver water at a given level in the body of water to be controlled when the gate is closed, a conduit similarly arranged in the lower portion of the gate to deliver water to the tank from a lower level when the gate is open, and a stop to limit the opening movement of the gate.

VINCENT K. JONES.

Witnesses:
 FRED LEWIS,
 ORRIN E. BLOOD.